United States Patent [19]

Jeter

[11] Patent Number: 4,520,055

[45] Date of Patent: May 28, 1985

[54] SPLIT LABEL INDEX TAB

[75] Inventor: Jack W. Jeter, Akron, Ohio

[73] Assignee: Jeter Systems Corporation, Akron, Ohio

[21] Appl. No.: 499,339

[22] Filed: May 31, 1983

[51] Int. Cl.$^3$ .......................... B32B 3/10; G09F 3/04

[52] U.S. Cl. .................................... 428/55; 428/121; 428/136; 428/122; 428/332; 283/81; 40/2 R; 40/23 A; 156/211; 156/216; 156/256; 156/268

[58] Field of Search .............. 428/136, 138, 121, 122, 428/55, 332; 156/211, 216, 256, 268; 40/2 R, 23 A; 283/81

[56] References Cited

U.S. PATENT DOCUMENTS 2,505,743 4/1950 Rose ............................... 156/216 X 3,805,426 4/1974 Cunningham ........................ 40/2 R

*Primary Examiner*—Alexander S. Thomas

*Attorney, Agent, or Firm*—Oldham, Oldham & Weber Co.

[57] ABSTRACT

The invention comprises a novel design for a label which can be applied to the edge of a folder, card, or other substrate. A paper face stock secured to a flexible film coating and having a pressure sensitive adhesive is provided with a plurality of cuts in parallel array. The cuts allow the label to be applied to a substrate having a substantial thickness without resulting in the wrinkling which would normally occur absent the cuts. A process for cutting the face stock consists of the use of a cutting disk having a plurality of edges. Substrates having a variety of thicknesses can be accommodated.

7 Claims, 2 Drawing Figures

SPLIT LABEL INDEX TAB

TECHNICAL FIELD

This invention lies in the art of adhesive labels and more specifically in the field of index labels for file folders. The invention utilizes a plurality of slits in the label face stock which facilitate application to the edge of a folder.

BACKGROUND ART

Heretofore, various methods have been utilized for applying indexing labels or tabs to various substrates. The most successful design incorporates a face stock laminated to a clear plastic film with a pressure sensitive adhesive for securement.

A convenient method of application involves the folding of the label over the edge of the folder or other substrate, the pressure sensitive adhesive providing securement on both sides. There are however several drawbacks to this method, one being that the label may be applied unevenly if the fold line is not parallel to the center line of the label. Even if the label is applied correctly, there is often a certain degree of wrinkling along the fold line because the paper face stock is not sufficiently stretchable to accommodate the bend. When this occurs there is a high probability of void spaces existing between the label and the substrate, allowing oxygen to enter and eventually degrade adhesion.

One solution has been to slit or score the label at a position where the fold is to be generated. This facilitates folding at the correct location as well as decreasing in some instances the amount of wrinkling by providing a complete separation of the face stock into two parts. Such a teaching is found in U.S. Pat. No. 3,805,426. What this method lacks however is the ability to adhere correctly to substrates of considerable thickness. When a single cut or score is made and the label is applied to a folder, card, etc. having a thickness somewhat greater than a sheet of paper, wrinkling will still occur because there is no mechanism for eliminating bending of the face stock at either corner of the edge surface. That is, if the slit is positioned at the center of the edge surface, the face stock is still required to bend at either corner. Naturally, the greater the thickness of the substrate, the more pronounced is the wrinkling and eventual degradation of adhesion.

Illustrative of cutting, perforating or otherwise introducing a fold line in the bending of a label is U.S. Pat. No. 3,348,324. This teaching also contains the limitations mentioned above. U.S. Pat. No. 3,324,823 discloses the use of "Mylar" (polyester film) in a label structure but otherwise does not deal directly with the problem of wrinkling of the label. U.S. Pat. Nos. 1,798,321 and 4,143,477 both make use of fold lines in a tab label. However there is no teaching or suggestion of how to eliminate wrinkling caused by the fold. U.S. Pat. No. 3,001,306 provides for index tabs comprising a laminate having extensions which are adhered to either side of a sheet material. There is no mention of a method for eliminating wrinkling.

From the above it is apparent that there is a need for a method of applying a label to a substrate having a considerable thickness, whereby wrinkling of the label is eliminated. This need is met by the instant invention.

DISCLOSURE OF THE INVENTION

It is accordingly an aspect of the invention to provide an index tab having an outer film label, a face stock, and a pressure sensitive adhesive layer.

It is another aspect of the invention to provide an index tab, as above, which is folded about the edge of a card, folder, or other substrate having a substantial thickness.

It is still another aspect of the invention to provide an index tab, as above, which can be folded correctly and easily at a predetermined location.

It is yet another aspect of the invention to provide an index tab, as above, which does not wrinkle.

It is still another aspect of the invention to provide an index tab, as above, having an adhesion to the substrate which does not decrease substantially with time.

It is yet another aspect of the invention to provide an index tab, as above, which contains a plurality of cuts in the face stock along the fold line.

These aspects and others which will become more apparent upon a reading of the preferred embodiments are acheived by: a label, comprising: a flexible film; a face sheet adhesively secured on one surface to said flexible film and having a plurality of parallel cuts therethrough; and a pressure sensitive adhesive positioned on the other surface of said face sheet; wherein said label is applied to the edge of a substrate, said parallel cuts positioned about the corners of said edge and portions of said label secured to opposite sides of said substrate.

Additionally, another aspect of the invention can be achieved by: a process for making a label, comprising: providing a sheet of paper face stock having pressure sensitive adhesive secured thereto and silicone coated paper backing over said pressure sensitive adhesive; cutting through said paper face stock with a cutting disk having a plurality of edges, said edges producing parallel cuts in said paper face stock; adhesively securing over said face stock a flexible film, producing a laminate; and cutting labels from said laminate using a plurality of knives; wherein said label is applied to a substrate after removing said silicone coated paper backing.

BRIEF DESCRIPTION OF THE DRAWINGS

In order to more fully understand the aspects and teachings of the invention, the following detailed description should be read in conjunction with the drawings; wherein.

BEST MODE FOR CARRYING OUT THE INVENTION

Figure 1:
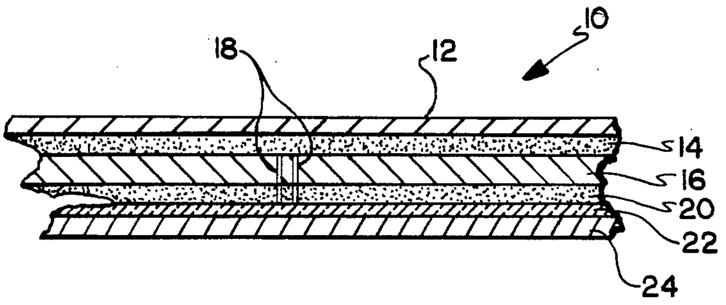
FIG. 1 is a cross sectional view showing the various layers of the index tab of the invention.

With reference to the drawings, and in particular to FIG. 1, an index label made by practice of the invention is designated generally by the number 10. A flexible film 12 is joined to a face stock 16 by means of an adhesive layer 14. The face stock contains a plurality of cuts 18 which also pass through a layer of pressure sensitive adhesive 20. A silicone release coating 22 separates the pressure sensitive adhesive layer from a paper backing 24.

Figure 2:
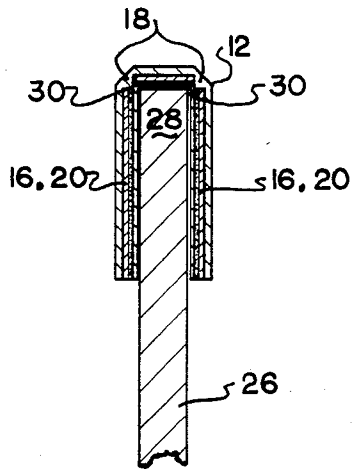
FIG. 2 is an end view of the index tab of the invention engaged about a substrate.

FIG. 2 illustrates the application of the label to a substrate 26 which can be a folder, card or the like. The label is applied over the edge 28 of the substrate, being folded over the edge corners 30. Naturally, the label is removed from the silicone coated paper backing prior to use. As can be seen in the figure, the cuts 18 in the face stock are positioned about the edge corners so that wrinkling is eliminated. Bending of the face stock does not occur because it has been separated into essentially three sections, one part on either side of the substrate and a portion comprising that left between the cuts resting on the substrate edge. While the figures indicate that only two cuts are used, a number greater than this can also be used effectively when the thickness of the substrate indicates. For example, three cuts can be used to accommodate an especially thick folder or card.

Generally the distance between cuts is from about 0.012 to about 0.017 inches. Preferably the spacing is about 0.015 inches. This provides for the most common situation, that is, where the label is applied to a folder having a thickness of about 0.014 inches or less. The label having three cuts would similarly be optimized for a substrate having a thickness of from about 0.015 to about 0.028, in which case the spacing between adjacent cuts would be as above.

The method of manufacturing the labels of the invention is conventional in all respects except of course in regard to the cutting of the face stock. The following is a generalized description of a typical manufacturing process which has been adapted so as to incorporate the features of the invention. Practice of the invention can also however be successfully carried out using processes which differ substantially from that given below.

A laminate comprising the face stock, pressure sensitive adhesive, silicone layer and paper backing is subjected to a cutting operation incorporating a rotary cutting disk and a pinch roller as in a standard die-cutting operation. The cutting disk or die actually comprises a plurality of edges corresponding to the number of cuts desired in the face stock. The clearance between the disk and the pinch roller corresponds generally to the thickness of the silicone coated paper backing, resulting in a cut in the laminate extending only through the paper stock and the pressure sensitive adhesive. Processing details such as cutting speed, assembly of the laminate and the like are well within the purview of the routineer.

The next step is application of the flexible film coating over the face stock which is accomplished by conventional means utilizing adhesives known in the art. Generally the flexible film is clear so as to provide visibility to the underlying face stock which commonly displays indicia such as numbering, lettering or the like, color coded or otherwise. After the flexible film is positioned, demarcation of the labels is provided by a rotating drum die having a plurality of knives operating in a manner analogous to cookie cutters. As the laminate passes beneath the rotating drum die, the knives cut through the face stock of the laminate stopping short of the silicone coated paper backing. The "flash" or excess materials surrounding the now clearly defined labels are removed, permitting the labels to be easily separated from the paper backing and thereafter applied.

Regarding specifically the composition of the materials comprising the labels, they are entirely conventional and known in the art. As mentioned above, the flexible film is preferably clear but may be, if desired, opaque or colored. The main requirements of this layer are flexibility to enable bending about the edge corners of the substrate without producing wrinkling, and durability for wear resistance. Examples of suitable films include the various cellophanes, polyethylene, polyvinylidene chloride and the like. Polyester film is preferred and is available from various manufactures in roll or sheet form.

The face stock can be any conventional type paper or other material used in the art but is preferably 60 pound coated lithographic paper, on which indicia can be printed or otherwise inscribed. Also conventional are the adhesives used in the label, namely the adhesive bond between the flexible film and the paper stock and the pressure sensitive adhesive. Several such adhesives are available commerically under various trade names.

The invention is applicable to a full range of label sizes, shapes and types. Accordingly, there is no intent to limit the scope of the invention regarding various thicknesses, dimensions, or other parameters, the determination of which can be readily made by those skilled in the art. This disclosure, in effect, is to be interpreted as being merely in compliance with the Patent Statutes, in that only the best mode and the preferred embodiments have been disclosed. The true measure of the scope of the invention is contained in the following claims.

What is claimed:

1. A label, comprising:

a flexible film;

a face sheet adhesively secured on one surface to said flexible film, coextensive with said flexible film, and having a plurality of parallel cuts therethrough, said parallel cuts dividing said face sheet into at least three separate individual pieces, and said parallel cuts being spaced from about 0.012 to about 0.017 inches apart; and a pressure sensitive adhesive positioned on the other surface of said face sheet;

wherein said label is adapted for flush application to the edge of a substrate, said parallel cuts being positionable about the corner of said edge.

2. A label according to claim 1, wherein said flexible film is clear polyester.

3. A label according to claim 2, wherein said face stock has two said parallel cuts spaced about 0.015 inches apart and wherein said label is adapted for use on a substrate having a thickness of about 0.014 inches or less.

4. A label according to claim 2, wherein said face stock has three said parallel cuts.

5. A process for making a label, comprising:

adhering a sheet of paper face stock to a silicone coated paper backing with a pressure sensitive adhesive;

introducing parallel cuts through said paper face stock, said parallel cuts being spaced apart from about 0.012 to about 0.017 inches;

adhesively securing over said face stock a flexible film, producing a laminate; and cutting labels from said laminate.

6. A process according to claim 5 wherein said cuts are linear.

7. A process according to claim 5 wherein said labels are formed by cutting through said face stock and flexible film.

* * * * *